Nov. 12, 1929.  R. STEHLE  1,735,064
GRAMOPHONE DRIVE
Filed Nov. 30, 1926
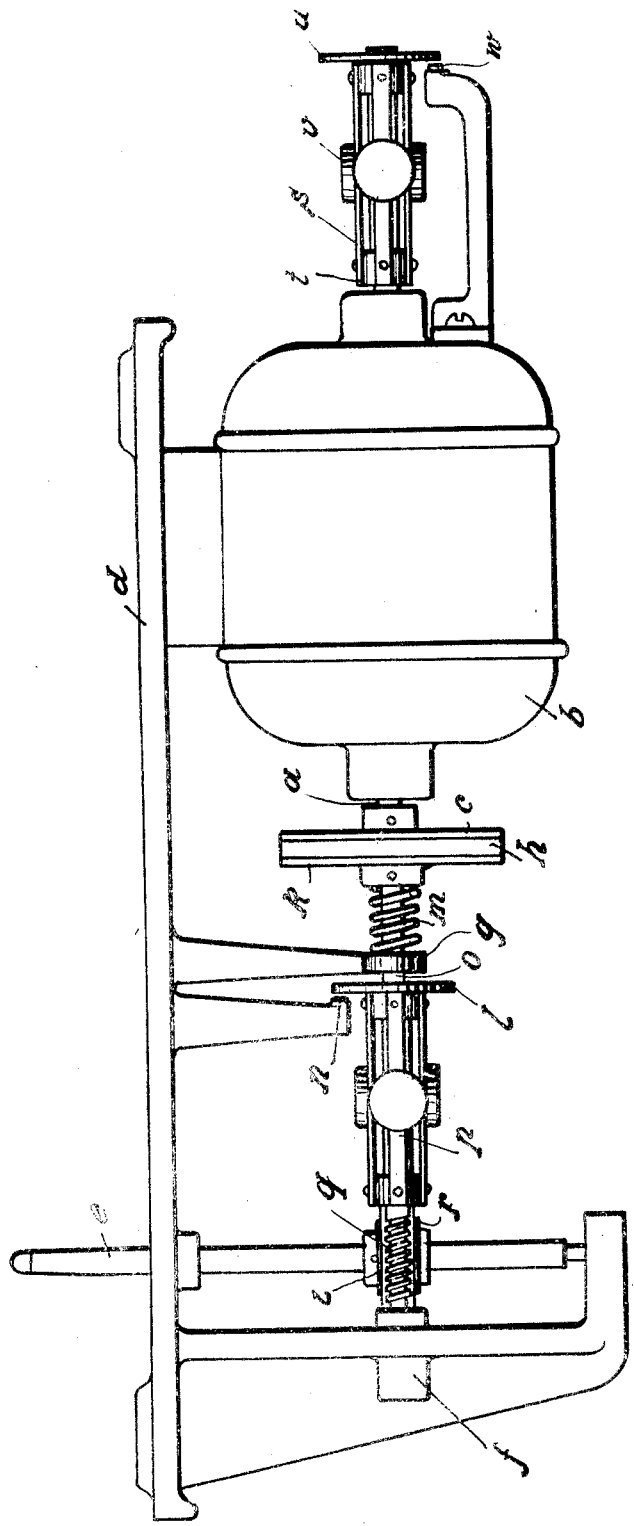
Inventor:
Robert Stehle
by
Atty.

Patented Nov. 12, 1929

1,735,064

UNITED STATES PATENT OFFICE

ROBERT STEHLE, OF FEUERBACH, GERMANY

GRAMOPHONE DRIVE

Application filed November 30, 1926, Serial No. 151,727, and in Great Britain June 4, 1926.

My invention relates to driving mechanism for talking machines. It is an object of my invention to provide a driving mechanism comprising an electric motor in which reduction gears, belts, pulleys and the like are eliminated but in which the driven shaft is rotated at substantially constant speed notwithstanding such elimination.

To this end I provide an axially floating shaft in said motor and worm gear for rotating the spindle of the turntable and I further provide the usual regulator for maintaining constant the speed of the driven shaft, but in addition to these parts I provide a friction clutch between the floating shaft of the motor and the driven shaft which is under substantially constant pressure and the pressure on which is not influenced by the operation of a second speed regulator on the shaft of the motor. Therefore in the case of any increase of speed in the motor which may be due to variations in voltage or to any other cause and which the regulator of the motor is unable to make up for, the clutch will slip until the speed of the motor has become normal. The friction clutch may be so designed or loaded that it will permanently slip during the normal operation of the drive.

In the drawings accompanying this specification and forming part of this application a device embodying my invention is illustrated diagrammatically by way of example.

Referring to the drawings, $b$ is an electric motor which is secured to a base plate $d$ and $a$ is its shaft. $c$ is a clutch disc secured on the end of the shaft and $k$ is the corresponding clutch disc on the end of the driven shaft $o$ which is carried in suitable bearings $f$ and $g$ of the plate. $h$ is a friction plate of felt or the like which is inserted between the two discs $c$ and $k$, and secured to the plate $c$ and $m$ is a spring on the shaft $o$ which tends to hold the disc $k$ against the friction plate $h$. It will be understood that the driven shaft $o$ is adapted to move axially in its bearings to the extent required, and the spring $m$ is abutted against the bearing $g$.

A speed regulator $p$ of the usual type is secured on the driven shaft $o$. Rotation is imparted to the spindle $e$ of the turntable (not shown) through the medium of a worm $q$ on the shaft $o$ and a worm wheel $i$ on the spindle $e$. A check plate $l$ is displaced on the shaft $o$ by the speed regulator $p$ and adapted to cooperate with a fixed check $n$ on the base plate $d$.

A similar regulator $s$ is secured on the shaft $a$ of the electric motor $b$ and equipped with centrifugal weights $v$ which cause the arms of the regulator to displace a check plate $u$ with respect to a fixed check block $w$ on the casing of the motor $b$. $t$ is a sleeve to which the arms of the regulator $s$ are hinged. In the normal position, that is, when the parts are rotating at the proper speed so that neither of the regulators $p$ or $s$ enters into operation, the shaft $a$ of the motor is held in a definite position by the thrust of the spring $m$ which is transmitted to the shaft through the medium of the disc $k$ on the driven shaft $o$, the friction plate $h$ and the disc $c$ on the motor shaft $a$. When the speed exceeds the normal, the weights of the regulators $p$ and $s$ fly out causing first the check plates $l$ and $u$ to engage the respective fixed checks $n$ and $w$. While the fixed check $n$ only exerts frictional resistance, the fixed check $w$ holds the check plate $u$ and consequently the end of the regulator $s$ at the right, against further displacement on the shaft $a$ so that upon further increase of the radius on which the weights $v$ are rotating, the sleeve $t$ which is held against axial displacement on the shaft $a$, moves the shaft $a$ to the right and reduces the pressure at the friction clutch in proportion. As will appear from the drawings the sleeve $t$ is arranged intermediate the disc $c$ of the friction clutch and the brake disc $u$. Therefore when the regulator $s$ causes the check plate $u$ to engage the stationary fixed check $w$ the disc and the shaft will become anchored at the fixed check and upon further operation of the regulator $s$ its arms will pull the shaft $a$ and the disc $c$ with its friction plate $h$ at the other end of the shaft away from the disc $k$ so that the operation of the regulator $s$ can never increase the pressure on the clutch by axial thrust but on the contrary tends to reduce it but such reduction is made up for by the spring $m$ causing the disc $k$ to follow the disc $c$ when the latter moves away from the disc $k$ with the friction plate $h$ so that the pressure in the clutch is substantially constant notwithstanding the slight elongation of the spring $m$.

Therefore when the voltage of the motor $b$ is increased, causing a proportional increase in its number of revolutions per minute, and if the regulator $s$ is not able to make up for the increase in time, then the friction plate $h$ will not be compressed and transmit more power to the driven shaft $o$ as would be the case if the relative arrangement of the sleeve $t$ and the check plate $u$ were reversed, that is the check plate $u$ and its fixed check $w$ were arranged in the position of the sleeve $t$, and vice versa.

With a drive as described variations of the system voltage amounting to about 60 per cent are made up for without noticeable variation of the speed of the spindle $e$ and therefore without influencing the operation of the machine.

I wish it to be understood that I do not desire to be limited to the exact details of construction shown and described for obvious modifications will occur to a person skilled in the art.

I claim:

1. A driving mechanism for talking machines comprising a motor having an axially floating shaft, a driven shaft, a friction clutch operatively connecting said motor shaft and said driven shaft, a speed regulator on said motor shaft, weights on said regulator, a check plate operatively connected with said weights, a fixed check adapted to be engaged by said plate in a given position of said weights, a sleeve held against axial displacement on said motor shaft, and means connecting said weights and said sleeve.

2. A driving mechanism for talking machines comprising a motor having an axially floating shaft, a driven shaft, a speed regulator operatively connected with said driven shaft, a friction clutch operatively connecting said motor shaft and said driven shaft, a speed regulator on said motor shaft, weights on said last-mentioned regulator, a check plate operatively connected with said weights, a fixed check adapted to be engaged by said plate in a given position of said weights, a sleeve held against axial displacement on said motor shaft, and means connecting said weights and said sleeve.

In testimony whereof I affix my signature.

ROBERT STEHLE.